United States Patent
Stevenson et al.

(10) Patent No.: US 7,641,842 B2
(45) Date of Patent: Jan. 5, 2010

(54) GRAPHICS TRANSFERS FOR USE IN ROTATIONAL MOLDING

(75) Inventors: Michael J. Stevenson, 1200 Soldier Pass Rd., Sedona, AZ (US) 86336; Robert A. Reeves, Cottonwood, AZ (US)

(73) Assignee: Michael J. Stevenson, Sedona, AZ (US)

( * ) Notice: Subject to any disclaimer, the term of this patent is extended or adjusted under 35 U.S.C. 154(b) by 157 days.

(21) Appl. No.: 10/348,884

(22) Filed: Jan. 23, 2003

(65) Prior Publication Data
US 2003/0132548 A1   Jul. 17, 2003

Related U.S. Application Data

(63) Continuation-in-part of application No. 09/862,542, filed on May 22, 2001, now Pat. No. 7,128,970.

(51) Int. Cl.
*B29C 39/12* (2006.01)
*B28B 1/20* (2006.01)

(52) U.S. Cl. ............... 264/310; 264/245; 264/247; 264/275

(58) Field of Classification Search ............ 264/245, 264/247, 275, 509, 310, 311; 156/230
See application file for complete search history.

(56) References Cited

U.S. PATENT DOCUMENTS

| | | | | |
|---|---|---|---|---|
| 3,108,850 | A | | 10/1963 | Brandt |
| 3,161,533 | A | * | 12/1964 | Gaynes ............... 427/208 |
| 4,519,972 | A | * | 5/1985 | Stevenson ............ 264/245 |
| 4,766,053 | A | * | 8/1988 | Shinozaki et al. ....... 430/256 |
| 5,223,315 | A | * | 6/1993 | Katsura et al. ....... 428/36.92 |
| 5,332,542 | A | * | 7/1994 | Yamanaka et al. ....... 264/509 |
| 5,498,307 | A | * | 3/1996 | Stevenson ............ 156/277 |
| 5,606,356 | A | | 2/1997 | Noguchi et al. |
| 5,695,587 | A | * | 12/1997 | Dumoux ............... 156/230 |
| 5,880,065 | A | | 3/1999 | Hayashi et al. |
| 5,908,694 | A | | 6/1999 | Makar et al. |
| 5,932,319 | A | | 8/1999 | Makar et al. |

(Continued)

FOREIGN PATENT DOCUMENTS

EP   488 696 A1   3/1992

*Primary Examiner*—Christina Johnson
*Assistant Examiner*—Patrick Butler
(74) *Attorney, Agent, or Firm*—Robert E. Strauss

(57) ABSTRACT

This invention is an indicia transfer and method for its use to impart indicia to polyolefin objects during rotational molding. The transfer is a laminate of at least two, and preferably, three coats on a carrier sheet, which is preferably a flexible, transparent polymer sheet. The coats, as successive layers on the carrier sheet are: an optional backing coat of a backing-coat pressure sensitive adhesive, an indicia coat of a colorants in a graphic or alphanumerical array, and a top coat of a pressure sensitive adhesive. The pressure sensitive adhesive used for the backing coat has a transition melting temperature less than the surface temperature of the mold to which the transfer is to be applied while the top-coat pressure sensitive adhesive has a temperature sensitive adhesive which becomes tacky at the demolding temperature to enable transfer of the coats to the interior surface of a rotational mold. All the coats have melting temperatures which are less than the molding temperature to enable transfer and fusing of the transfers into the surface of the molded part.

14 Claims, 1 Drawing Sheet

U.S. PATENT DOCUMENTS

| | | | |
|---|---|---|---|
| 5,935,692 A * | 8/1999 | Smith | 428/32.81 |
| 6,254,970 B1 | 7/2001 | Hiatt et al. | |
| 6,309,504 B1 * | 10/2001 | Langan | 156/278 |
| 6,620,473 B2 * | 9/2003 | Nishizawa et al. | 428/35.7 |
| 6,682,679 B1 * | 1/2004 | Marentic et al. | 264/247 |
| 6,726,969 B1 * | 4/2004 | Balaji et al. | 428/35.7 |
| 6,773,653 B2 * | 8/2004 | Miller et al. | 264/447 |

* cited by examiner

GRAPHICS TRANSFERS FOR USE IN ROTATIONAL MOLDING

RELATION TO OTHER APPLICATIONS

This application is a continuation-in-part of our application Ser. No. 09/862,542, filed May 22, 2001, now U.S. Pat. No. 7,128,970.

BACKGROUND OF THE INVENTION

1. Field of Invention

This invention relates to rotational molding of plastics and, in particular, to transfers useful to impart graphic and alphanumerical information to rotational molded products.

2. Brief Statement of the Prior Art

Rotational molding is traditionally used for fabrication of hollow form objects from plastics, particularly from polyethylene. Polyolefin surfaces, particularly polyethylene surfaces, however, resist acceptance of coats. A prevalent method of imparting coatings of materials such as printed matter or decoration has been to oxidize the polyethylene surface by flame treatment to improve adhesion of subsequently applied materials. A less destructive method is described in U.S. Pat. No. 4,352,762 in which decorative or alphanumerical indicia are applied as a viscous oil suspension to the interior mold surface by silk screen printing for transfer to the molded part during molding. Further developments of this approach have included transferring indicia from a carrier sheet by burnishing the indicia onto the interior surface of the mold; see U.S. Pat. No. 4,519,972. These developments spurned other developments such as disclosed in U.S. Pat. Nos. 5,648,030 and 5,498,307. Commercial practice with such graphics transfers developed a technique of spraying the interior surfaces of the mold with an adhesive to enhance bonding, and hence transfer, of the graphics indicia to the mold surfaces from a carrier sheet. In practice, however, the adhesives are often not applied uniformly and frequently are used in excess, causing product discoloration and adhesive buildup on the mold surfaces. The adhesive sprays also use volatile solvents which present environmental concerns during use, shipment and storage. If not completely expelled prior to application of the transfer, any residual solvent will damage the indicia of the transfer. The application of an adhesive to the mold surface prior to application of the transfer also adds a further step to the molding operation, prolonging the molding cycle time.

OBJECTIVES OF THE INVENTION

It is an objective of this invention to provide a method to impart indicia to the surface of molded polyolefin, particularly polyethylene, parts.

It is also an objective of this invention to provide a method of imparting indicia to the surface of a mold without use of adhesive sprays.

It is an additional objective of this invention to provide a transfer and method of its use to impart indicia to an interior surface of a mold which minimize delays in the molding cycle.

It is likewise an objective of this invention to provide an indicia transfer which can be precisely located on the interior surface of a mold.

It is a further objective of this invention to provide an indicia transfer having various agents which transfer to the mold surface and become additives and enhancers in the surface of the molded part.

Other and related objectives will be apparent from the following description of the invention.

BRIEF DESCRIPTION OF THE INVENTION

This invention is an indicia transfer and method for its use to impart indicia to polyolefin parts during molding. The transfer is a laminate of at least two coats on a carrier sheet, which is preferably a flexible, transparent polymer sheet. The coats, as successive layers on the carrier sheet are: an optional, but preferred backing coat of a backing-coat pressure sensitive adhesive, an indicia coat of a indicia in a graphic or alphanumerical array, and a top coat of a top-coat pressure sensitive adhesive. A protective overlay or slip sheet can also be provided to protect the coats during shipment and storage of the transfer. When a backing coat is used, the pressure sensitive adhesive used for the backing coat has a lower transition melting temperature than does the pressure sensitive adhesive used for the top coat to enable transfer of the coats to the interior surface of a rotational mold and transfer of the coats to the molded part during molding.

BRIEF DESCRIPTION OF THE DRAWINGS

The invention will be described with reference to the drawings of which.

DESCRIPTION OF THE PREFERRED EMBODIMENTS

Figure 1:
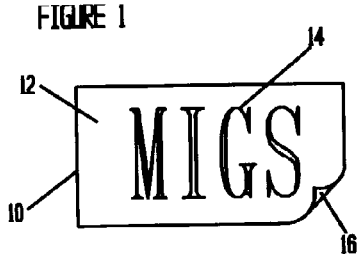
FIG. 1 illustrates a transfer of the invention.

The invention is intended for use in rotational molding operations, In this operation, hollow-form plastic parts are formed in a rotational molding cycle wherein plastic particles are charged to a rotational mold, the mold is closed, heated to a molding temperature while being rotated about its major and minor axes for a time sufficient to form the molded part and the mold is cooled to a demolding temperature, opened and the molded product is ejected, Referring to FIG. 1, the transfer 10 of the invention is illustrated as comprising a flexible laminate sheet having a carrier sheet 16 which receives an indicia coat 14 that is covered with a top coat 12. As described hereinafter, the top coat 12 comprises an adhesive. As illustrated, the adhesive top coat 12 is above the indicia coat 14 and the carrier sheet 16. The indicia material of the indicia coat 14 is printed on the carrier sheet 16 in the order that it is to appear in the final rotationally molded part. Although not illustrated in FIG. 1, a backing coat which is located between the indicia coat and the carrier sheet 16 is a preferred option, also as described hereinafter.

The carrier sheet 16 useful for the transfer of this invention can be any flexible, dimensional stable paper or plastic film. Paper such as parchment paper can be used, however, the use of an adhesive backing coat permits the use of plastic film and transparent plastic film, particularly polyester film which is preferred because it permits precise, visual orientation of the indicia on the interior mold surface.

The indicia coat 14 comprises an indicia material in a printed pattern such as a graphic or alphanumerical array which is desired to be imparted to the product during molding. The indicia material is used admixed with wax. Preferably the mixture contains these components in proportions suitable for hot screen printing such as from 30 to 99 weight percent wax and from 1 to 70 weight percent indicia material. Preferably the mixture contains from 60 to 85 weight percent wax and from 15 to 40 weight percent indicia material. If desired, viscosity additives such as silica or silicates can be added in minor amounts to provide an optimum molten viscosity (100 to 1000 centipoise) for hot screen printing.

The wax used in the indicia coat 14 can be a hydrocarbon wax which is preferably transparent or lightly colored so as to avoid any coloration or shading to the indicia. Examples of suitable waxes include natural waxes, paraffin wax, synthetic wax, microcrystalline wax, etc. A very suitable wax is a microcrystalline wax having a melting point from 90 to 300 degrees F., preferably from 110 to 250 degrees F. and a molecular weight from 500 to 1000, preferably from 600 to 750. Microcrystalline waxes are refined petroleum waxes extracted from highly paraffinic petroleum stocks.

Plastic waxes are less refined and contain branched chain and cyclic hydrocarbons. Typically plastic waxes have hardness values and crystallinity less than those of microcrystalline waxes.

Paraffin wax comprises chiefly n-paraffin hydrocarbons having from 16 to 38 carbons with limited quantities of branched chain paraffins, monocyclic and polycyclic paraffins.

Synthetic hydrocarbon waxes are obtained by the polymerization and copolymerization of hydrocarbon olefins such as ethylene and propylene. Typically these synthetic waxes have molecular weights from 400 to about 3,000 with a narrow molecular weight distribution.

Various additives can be incorporated in the wax in minor quantities to improve the flexibility and toughness of the wax such as polyisobutylene to increase the viscosity of the molten wax and indicia mixture, and ultraviolet light protectants such as hindered amines.

These additives can be used in amounts from 2 to 25 weight percent of the mixture. Tackifiers such as polyterpene resins, rosins and aliphatic and aromatic hydrocarbons can also be used in amounts from about 5 to 35 weight percent of the mixture.

Useful indicia material can be colorants such as pigments and dyes as well as metal particles in flake or ball shape. Useful colorants include those containing inorganic pigments such as titanium dioxides (rutile analase), zinc oxide, iron oxides in hues such as yellow, buff, tan, brown, salmon and black, iron chromates and molybdates for colors from light yellow to red orange, lead chromates, lead sulfate, lead molybdate, chrome yellows and oranges, cadmium pigments in a variety of yellows, oranges, reds and maroons as pure cadmium colors or with barium sulfide or cadmium sulfoselenides, nickel and titanium dioxide mixtures, sodium, potassium or ammonium coordination compounds of ferriferrocyanide, ultramarine blues (a calcined mixture of china clay, sodium carbonate, silica, sulfur and reducing agents), cobalt aluminate (cobalt blues), chromium oxide, metal flake pigments such as aluminum zinc copper borate powders, metal silver pigments, pearlescent and iridescent flakes of basic lead carbonates, bismuth oxychlorides and titanium coated mica, etc. Various organic pigments which are useful include azo pigments such as benzimidazolone pigments, pyrazolone pigments, copper phthalocyanine quinacridones, anthraquinones, condensations pigments, tetra-chloro-isoindolinones, carbon blacks, etc. In instances where electrical conductivity is desired, flakes and powders of metals such as copper, nickel, silver, silver coated nickel, silver coated glass beads, antimony doped tin oxide can be used.

The indicia in graphic or alphanumerical array is coated onto the carrier sheet 16 in a manner consistent with the desired resolution. Printing is preferred to achieve maximum resolution of the indicia array. Since the transfer is used in a two step transferring process, first to the inside wall surface of a mold and thereafter from the mold wall to the product, the indica array is applied in a direct orientation onto the carrier sheet 16, rather than as a mirror image as required for conventional single step transfers.

The top coat 12 functions to provide adhesion of the indicia coat 14 and backing coat to the hot interior surface of the mold and to release from the mold surface during the molding operation, becoming incorporated with the indicia and backing coat into the surface of the molded part.

The pressure sensitive adhesive useful in the top coat 12 is substantially non-tacky at ambient temperatures and becomes tacky at the temperature of the mold surface to which the transfer is applied, typically at demolding temperatures from 90 degrees to 170 degrees F., preferably from 110 degrees to 160 degrees F.

To facilitate this function, the transition melting temperature of the pressure sensitive adhesive used for top coat 12 is greater than that of the backing coat and is greater than the temperature of the mold surface to which the transfer is applied, typically at or less than the demolding temperature. Preferably, the viscosity of the pressure sensitive adhesive used for this coat is from 100 to 1000 centipoise at the demolding temperature.

The top coat 12 can also contain additives which are useful in the surface of the final molded product. Examples of such additives are ultraviolet light protectants such as hindered amines, abrasion resistant materials such as glass beads, optical brighteners, and colorants to tint the transferred indicia and iridescent agents such as flakes of basic lead carbonates, bismuth oxychlorides and titanium coated mica.

The backing coat of the transfer of this invention functions to bond the successive indicia and adhesive coats to the carrier sheet 16 during handling and storing of the transfer which occurs at ambient temperatures and to release from the carrier sheet 16 at or near the temperature of the mold surface to which the transfer is applied, which preferably is at typical demolding temperatures, from 100 to about 170 degrees, more typically from 110 to about 125 degrees F. Additionally, the pressure sensitive adhesive should have a transition melting temperature less than the temperature of the mold surface to which the transfer is applied to obtain clean separation from the carrier sheet 16.

The backing coat can also include selected colorants to impart background color for the indicia, or fillers such as silica or silicates, abrasion resistant additives such as glass beads to provide such as hindered amines. The weight content of pigments depends on the type of pigment and intensity of background color desired, however, the pigments can be used at a concentration of from 1 to about 65 weight percent, preferably from 25 to 45 weight percent. Fillers and abrasion resistant additives can be used at concentrations from 1 to about 75 weight percent, preferably from 25 to 50 weight percent. The maximum temperatures at which the top and indicia coats change from a solid to liquid should be less than the molding temperature and preferably less than the melt temperature of the molding polymer used for the molded part. Since the coats which contain blends of components do not exhibit sharp melting points, the temperature band at which the solid to liquid phase occurs for a blend is referred to herein to as its transition melting temperature. All of the components of the coats should be stable and resist decomposition and decoloration at molding temperatures, typically from 350 degrees to 650 degrees F. The applied coats should also be flexible to permit placing the transfers against contoured mold surfaces without chipping or cracking.

The top and backing coats are applied over one or more areas of the carrier sheet 16 selected to receive the indicia coat 14. Preferably the backing coat (when used) and the top coat 12 are applied over an area slightly greater than the area which receives the indicia coat, thereby overlapping the indicia coat 14. When a backing coat is used, the indicia coat 14 is encapsulated entirely between the backing and top coats.

Figure 2:
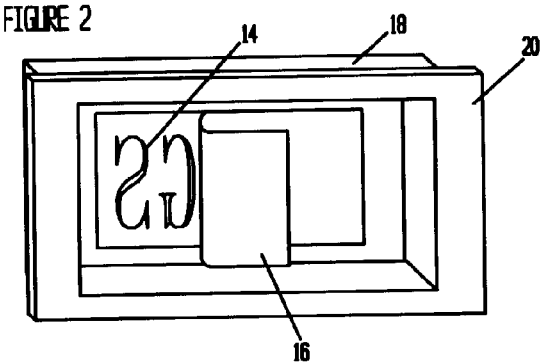
FIG. 2 illustrates the application of the transfer to a rotational mold.
Figure 3:
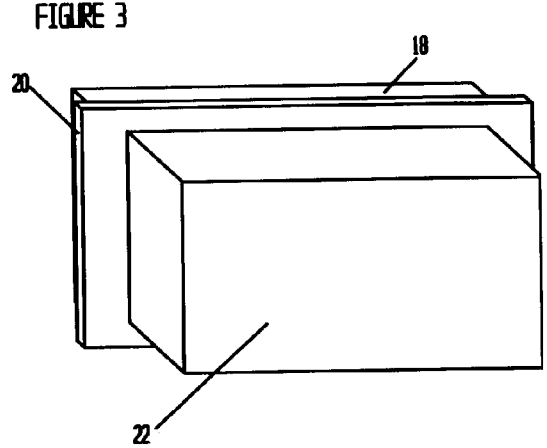
FIG. 3 illustrates a molded part prior to ejection from the rotational mold.
Figure 4:
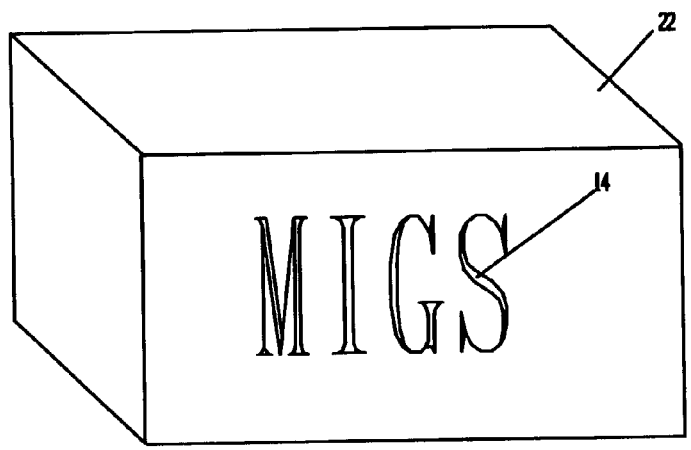
FIG. 4 illustrates the molded part with the graphics of the transfer embedded into the outside surface of the molded part.

FIG. 2 illustrates the application of the transfer to an interior surface 17 of a mold cavity 18. The mold cavity is typical of molds used in rotational molding having an internal configuration corresponding to the exterior shape of the part to be molded. In the illustration the part is a rectangular hollow form box. The cavity 18 is one part of two or more cavity parts which are joined along a flange face 20. The transfers such as 10 are readily applied to the hot internal surface of molds used in rotational molding with the top coat 12 in direct contact with the mold surface. Because the carrier sheet 16 of the transfers is a flexible, transparent plastic film, the transfer can be precisely oriented and applied to the mold surface. The transfer is completed by pressing the exposed outer surface of the carrier sheet 16 against the interior surface 17 of the mold cavity 18. The coats of the transfer adhere to the hot mold surface 17, releasing the carrier sheet 16, which is removed. Since the carrier sheet 16 readily separates from the coats it is not necessary to use burnishing pads or other implements to secure the release, thus avoiding the possibility of marring the interior surface of the mold. Thereafter, the steps and conditions typically practiced with rotational molding can be practiced, since the transfers of the invention are entirely compatible with conventional rotational molding. Briefly, these steps are to charge the mold with molding resin, typically polyethylene resin particles with sizes from 16 to 60, usually 35 mesh, close the mold and heat it to the molding temperatures while rotating the mold about its major and minor axes for the time and at the temperature conditions tailored for the particular product and molding resin. During the molding cycle, the coats transfer to the product and become permanently incorporated into the outer surface of the product. At the completion of the molding cycle, the mold is cooled and the mold cavity parts are separated to expose the molded part 22 shown in FIG. 3. The molded part 22 is ejected and is shown in FIG. 4 with the backing coat, indicia coat 14 and top coat 12 all embedded into the exterior surface of the part 22. Because the transfer was a two step transfer, the indicia 14 appear on the molded part in the same order or array as the indicia appeared on the carrier sheet 16 in FIG. 1. All the coats of the transfer separate from the surface of the mold, leaving no significant amount of residue on the mold surface when the molded product is ejected from the mold.

The invention is further described and illustrated in the following example.

EXAMPLE

A transfer is prepared by applying a backing coat of a pressure sensitive adhesive to a transparent polyester film having a thickness of 1 mil. The pressure sensitive adhesive is a hydrocarbon wax blend having a transition melting temperature of 115-135 degrees F. Thereafter, an indicia coat having indicia consisting of graphics (a trademark logo) and printed material (product name and manufacturer source data) is coated over the backing coat.

The composition useful for the indicia coat is a mixture of a synthetic wax having a transition melting temperature of 165 degrees F., and 10 weight percent of carbon black.

Thereafter, a top coat of a pressure sensitive adhesive is applied over the area previously printed with the backing and indicia coats. The pressure sensitive adhesive used for this coat is a hydrocarbon resin blend having a transition melting temperature of 130-170 degrees F.

The transfer is applied to the internal surface of a rotational mold having a surface temperature of 145 degrees F. by pressing against the exposed, unbolted side of the carrier sheet to transfer the coats to the mold surface. The carrier sheet is removed, the mold is charged with 35 mesh polyethylene resin particles, closed and processed through a molding cycle by heating the mold to 500 degrees F. while rotating the mold at 8 rpm about its major axis and 2 rpm about its minor axis for 10 minutes. The mold is then cooled to 148 degrees F., opened and the product is ejected. The product has the indicia permanently embedded in its outer surface and the interior of the mold is clean with no residue from the transfer coats.

The invention has been described with reference to the illustrated and presently preferred embodiment. It is not intended that the invention be unduly limited by this disclosure of the preferred embodiment. Instead, it is intended that the invention be defined by the elements, and their obvious equivalents, set forth in the following claims.

What is claimed is:

1. In a rotational molding method for fabrication of a molded, hollow form polyethylene product in a rotational molding cycle wherein polyethylene particles are charged to a rotational mold, the rotational mold is closed, heated to a molding temperature from about 350 to 650 degrees F. while being rotated about its major and minor axes for a time sufficient to form said molded product and the mold is cooled to a demolding temperature from 90 to 170 degrees F., opened and the molded product is ejected, including the in-mold incorporation of indicia in an indicia area within the exterior surface of said molded product which consists essentially of:
    a. applying to a selected indicia area of the interior surface of the rotational mold at a temperature from 90 to 170 degrees F. successive layers of:
        I. a top coat covering said indicia area and comprising a hydrocarbon resin pressure sensitive adhesive having a melting temperature less than said molding temperature and greater than said demolding temperature and being tacky at said demolding temperature;
        ii. an indicia coat of a mixture of colorant and hydrocarbon wax having a melting temperature greater than said demolding temperature and less than said molding temperature overlying said top coat in a preselected indicia array;
        iii. a backing coat covering said indicia coat and comprising a backing coat pressure sensitive adhesive which is adhesive at ambient temperatures and which has a melting temperature less than said demolding temperature of 90 to 170 degrees F., and
        iv. a carrier sheet;
    wherein said backing coat pressure sensitive adhesive bonds said indicia coat to said carrier sheet at ambient temperatures and permits said carrier sheet to separate from said backing and indicia coats at said demolding temperature and wherein said indicia, bottom and top coats are stable and resistant to decomposition at said molding temperature;
    b. pressing said carrier sheet against said coats to bond said coats to said inside surface of said mold;

c. removing said carrier sheet and leaving said top, indicia and backing coats on said inside surface of said mold;

d. continuing said rotational molding method by charging polyethylene molding resin into said mold, closing said mold, heating said mold to said molding temperature while rotating said mold about its major and minor axes for a time sufficient to form said molded product and cause said indicia, bottom and top coats to transfer to and become permanently incorporated into the surface of said product, cooling said mold to said demolding temperature, opening said mold and ejecting a molded product having said top, indicia and backing coats fused into its outside surface leaving no significant amount of residue on the mold surface.

2. The method of claim 1 wherein said carrier sheet, backing coat, indicia coat and top coat are formed as a transfer and the step of applying said coats to said selected area of the interior surface of the mold is performed by application of said transfer to said selected indicia area.

3. The method of claim 2 wherein said backing and top coats extend peripherally beyond said selected indicia coat, thereby encapsulating said indicia coat between said backing and top coats.

4. The method of claim 2 wherein the melting temperature of the backing coat pressure sensitive adhesive is less than that of the top coat pressure sensitive adhesive.

5. The method of claim 1 wherein said indicia coat is a mixture of from 30 to 99 weight percent hydrocarbon wax and from 1 to 70 weight percent indicia material.

6. The method of claim 2 wherein said backing coat adhesive is a hydrocarbon wax.

7. The method of claim 1 wherein said flexible carrier sheet is a transparent plastic film.

8. The method of claim 7 wherein said plastic film is polyester film.

9. The method of claim 1 wherein said indicia coat is a mixture of from 60 to 85 weight percent hydrocarbon wax and from 15 to 40 weight percent colorant.

10. The method of claim 9 wherein said hydrocarbon wax is a synthetic wax.

11. The method of claim 10 wherein said hydrocarbon wax is a lightly colored or transparent wax.

12. The method of claim 2 wherein said pressure sensitive adhesive of said top coat is non-tacky at ambient temperatures.

13. The method of claim 1 wherein the demolding temperature is from 110 to 160 degrees F.

14. The method of claim 1 wherein the demolding temperature is from 110 to 125 degrees F.

* * * * *